United States Patent
Balachandran et al.

(10) Patent No.: US 10,313,994 B2
(45) Date of Patent: Jun. 4, 2019

(54) VARIABLE SYNCHRONIZATION BLOCK FORMAT

(71) Applicant: TELEFONAKTIEBOLAGET L M ERICSSON (PUBL), Stockholm (SE)

(72) Inventors: Kumar Balachandran, Pleasanton, CA (US); Johan Axnäs, Solna (SE); Dennis Hui, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 197 days.

(21) Appl. No.: 15/172,254

(22) Filed: Jun. 3, 2016

(65) Prior Publication Data

US 2017/0094624 A1    Mar. 30, 2017

(30) Foreign Application Priority Data

Jun. 15, 2015  (WO) .................. PCT/IB2015/054522

(51) Int. Cl.
*H04W 56/00* (2009.01)
*H04W 72/08* (2009.01)
*H04W 72/04* (2009.01)
*H04L 5/00* (2006.01)
*H04L 12/26* (2006.01)

(52) U.S. Cl.
CPC ......... *H04W 56/0015* (2013.01); *H04L 5/006* (2013.01); *H04L 5/0007* (2013.01); *H04L 43/16* (2013.01); *H04W 56/00* (2013.01); *H04W 72/0446* (2013.01); *H04W 72/085* (2013.01)

(58) Field of Classification Search
CPC ......... H04W 56/0015; H04W 72/0446; H04W 72/085; H04W 56/00; H04L 5/006; H04L 5/0007; H04L 43/16
See application file for complete search history.

(56) References Cited

U.S. PATENT DOCUMENTS

| | | |
|---|---|---|
| 9,277,519 B1 * | 3/2016 | Pu .................... H04W 56/005 |
| 2014/0198772 A1 | 7/2014 | Baldemair |
| 2014/0286286 A1 * | 9/2014 | Yamazaki ............ H04W 56/00 370/329 |
| 2016/0227502 A1 * | 8/2016 | Vos .................... H04W 56/0015 |
| 2016/0323757 A1 * | 11/2016 | Braun .................. H04B 7/0617 |

FOREIGN PATENT DOCUMENTS

WO    2014/161106 A1    10/2014

* cited by examiner

*Primary Examiner* — Kwang B Yao
*Assistant Examiner* — Moo Jeong

(57) ABSTRACT

An access node, AN, may be configured to communicate wirelessly with a wireless device (WD). The AN can transmit a first synchronization signal block having a first format. The AN can also transmit a second synchronization signal block of a second format, the first synchronization signal block including a first format different from the format of the second synchronization signal block. The first synchronization signal block can include an extended primary synchronization signal block that can be used to synchronize disadvantaged user equipment (e.g., user equipment experiencing low signal-to-noise ratio).

29 Claims, 10 Drawing Sheets

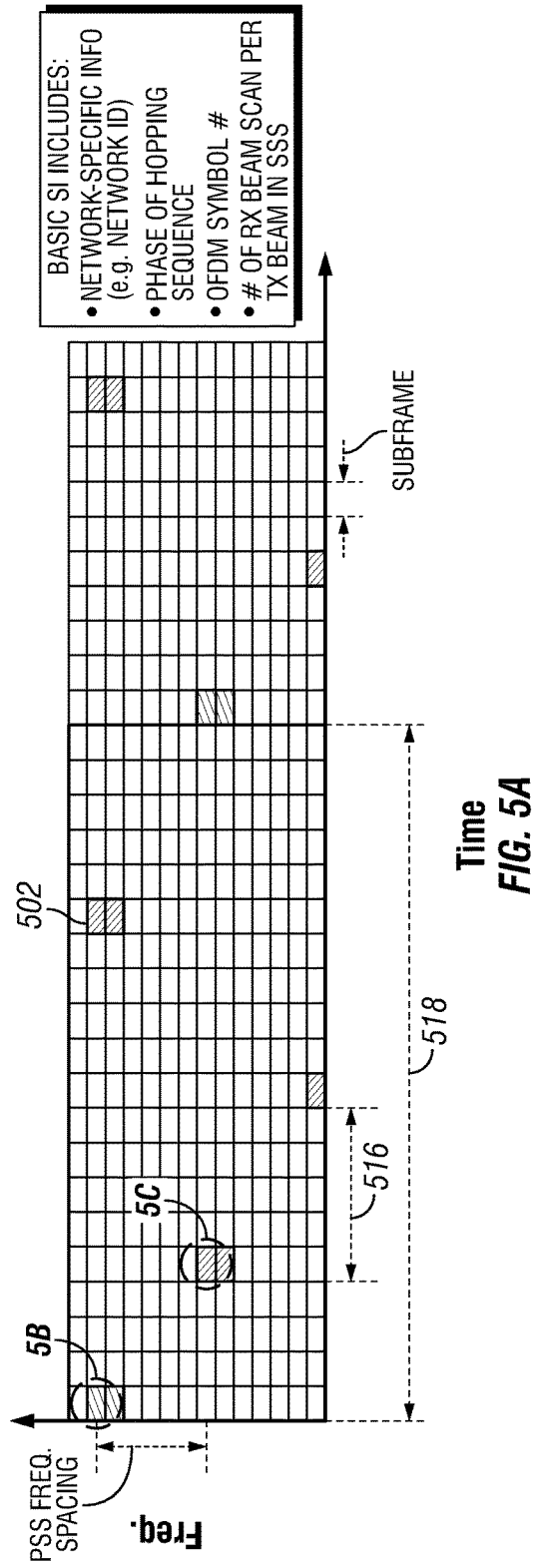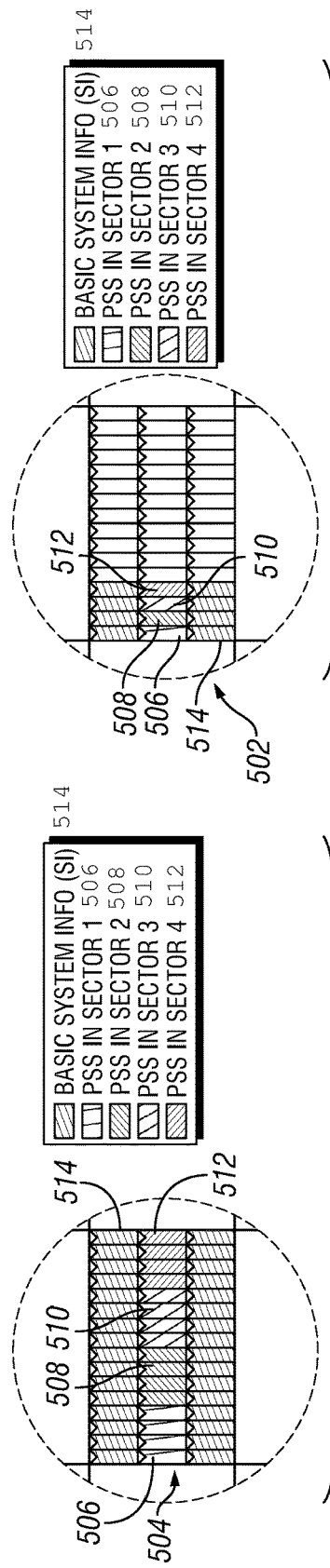
FIG. 5A
FIG. 5B
FIG. 5C

VARIABLE SYNCHRONIZATION BLOCK FORMAT

CROSS-REFERENCE TO RELATED APPLICATIONS

This application claims priority to International Application No. PCT/IB2015/054522, filed Jun. 15, 2015, the contents of which are incorporated herein by reference.

FIELD

This disclosure pertains to variable synchronization block formats, and more particularly, to variable synchronization block formats for efficient beam-forming.

BACKGROUND

In networks that operate at high carrier frequencies, such as the millimeter wave (mmW) band or in bands that are higher than those used by conventional cellular networks such as Long Term Evolution (LTE) and High Speed Packet Access (HSPA), the link between an access node (AN) and the wireless device (WD) may depend on high gain directivity to limit interference in the network and to provide high signal-to-noise ratio (SNR) links.

FIG. 1 is a schematic illustration of beam finding resulting in varying signal-to-noise ratios experienced by different wireless device. The radios in the network may have varying capabilities. FIG. 1 shows two established links from an AN to two WDs (WD1 with high SNR and WD2 with low SNR) and several potential links to WDs in the coverage area of the AN. The environment is prone to spotty coverage and SNR can vary significantly between WDs. In addition, WDs in the network can have varying capabilities such as the use of analog vs. digital beam-forming. There is therefore a possibility of widely varying SNRs between various links in the network.

SUMMARY

The use of spatial directivity can use signaling structure and procedures for beam finding during initial access and handover. This disclosure pertains to the definition of signaling structures for synchronization signals, including synchronization signals for such future systems, such as mmW Radio Access Technology systems (or mmW RAT systems).

In general, beam-finding should occur in the shortest possible time period, while at the same time, disadvantaged WDs should accumulate enough energy from the synchronization signal without a burden of subjecting other WDs to long beam-finding time periods.

This disclosure pertains to a design for the transmission of synchronization sequences. The synchronization signals are periodically broadcast by the AN. In embodiments, the AN can broadcast the synchronization sequences using more than one format, where at least one format is transmitted over a longer period of time than the other single format or plural formats. The longer synchronization blocks target users that have low SNR or are disadvantaged in other ways such as restrictions like analog beam-formers.

In embodiments, the AN can broadcast synchronization signals in at least two groups, at least one over an extended time duration and at least another in a short block period. In embodiments, the shorter blocks can occur in multiple subgroups, some of which favor beam patterns that are more prevalent from historical reports.

Embodiments may include repeating certain beam directions more often that other beam directions to favor certain areas of coverage. A further embodiment is directed to reordering beam patterns to favor beams that are more frequently used.

In another embodiment of the invention, the longer blocks and the shorter blocks can further include different numbers of repetitions of the synchronization signal to allow receivers of different capabilities to potentially find its own receive beam in the appropriate direction.

Establishing links to each of the WDs in the coverage area will proceed by timing synchronization signals in various directions, allowing enough time for the WD in a particular direction to detect the synchronization signal and to potentially train its own receive beam in the appropriate direction.

Aspects of the present disclosure are directed to an access node and methods performed by an access node (AN). The AN is configured to communicate wirelessly with a wireless device (WD). The AN includes hardware circuitry including a processor for executing instructions, a memory for storing instructions and data, and a transceiver for transmitting and receiving signals wirelessly via one or more antennas. The processor can be a hardware processor that can execute instructions stored on the memory. The AN can transmit a first synchronization signal block for a first format lasting a first duration of time. The AN can transmit a second synchronization signal block of a second format lasting a second duration of time. The first format is different from the second format and the first duration is longer than the second duration.

Aspects of this disclosure pertain to wireless device (WD). The WD may include a hardware processor, a memory, and a transceiver. The WD may be configured to receive from the AN a first synchronization signal block of a first format lasting a first duration of time. The WD may also be configured to receive from the AN a second synchronization signal block of a second format lasting a second duration of time, wherein the first synchronization signal block comprising a first format different from the format of the second synchronization signal block, and the first duration comprising a longer than the second duration.

In some embodiments, the AN is part of a millimeter wave radio access technology (mmW RAT). In some embodiments, the WD is configured for and in operation within a mmW RAT.

In some embodiments, the second synchronization signal block comprises a primary synchronization signal block and the first synchronization signal block comprises an extended primary synchronization signal block.

In some embodiments, one or both of the first synchronization signal block and the second synchronization signal block repeatedly activate the same beam two or more times (e.g., for beam training at receiver or for energy collection for receivers with low signal-to-noise ratio).

In some embodiments, a system-information block is transmitted adjacent in time or in frequency to one or both of the first synchronization signal block or the second synchronization block.

In some embodiments, the system-information block transmitted adjacent to the first synchronization signal block contains information about the set of beams activated in the second synchronization signal block In some embodiments, the information about the set of beams activated in the second synchronization signal block includes the number of times at least one of the activated beam are repeatedly activated within the second synchronization signal block.

In some embodiments, the system-information block contains the OFDM symbol number within a subframe.

In some embodiments, the second synchronization signal block activates more beams per sector than the first synchronization signal block.

In some embodiments, the second synchronization block activates beams with a history of past wireless device detections.

In some embodiments, the second synchronization block activates beams with a historic signal-to-noise ratio above a threshold value.

In some embodiments, the second synchronization signal activates a subset of the beams activated by the first synchronization signal.

In some embodiments, the secondary synchronization signal activates beams having wider coverage than the beams activated by the primary synchronization signal.

In some embodiments, the first synchronization signal block is transmitted with less periodicity than the second synchronization signal block.

In some embodiments, the first synchronization signal block is transmitted once per transmission period and the second synchronization signal block is transmitted at least twice per transmission period.

In some embodiments, the first synchronization signal block of the first format comprises an extended primary synchronization signal and an extended secondary synchronization signal, the extended secondary synchronization signal located in a fixed relative location from the extended primary synchronization signal.

In some embodiments, the extended secondary synchronization signal is located in a next subframe from the extended primary synchronization signal in the first synchronization signal block.

In some embodiments, the extended secondary synchronization signal comprises AN-specific pilot sequences.

In some embodiments, the extended secondary synchronization signal comprises a maximum length sequence (MLS).

In some embodiments, the first synchronization signal block is phase offset from the second synchronization signal block.

Advantages of the embodiments described in this disclosure are readily apparent to those of skill in the art. Among the advantages include the advantage of getting the AN to settle into a search procedure that favors a natural coverage area for the AN. The technique acknowledges the wide variation in channel quality in the coverage area and helps expedite synchronization of WDs in the coverage area on the basis of most likely directions to find WDs. In addition, the beam-finding performance of WDs with good SNR can be improved while also allowing eventual synchronization with WDs that are relatively disadvantaged.

BRIEF DESCRIPTION OF THE DRAWINGS

FIG. 5A is a schematic diagram of a frame structure showing extended synchronization signals in accordance with embodiments of the present disclosure.

FIG. 5B is a schematic diagram of an extended synchronization signal in accordance with embodiments of the present disclosure.

FIG. 5C is a schematic diagram of a synchronization signal in accordance with embodiments of the present disclosure.

DETAILED DESCRIPTION

This disclosure pertains to the design of synchronization blocks from an access node (AN) that uses beam-forming to enable access by wireless devices (WDs) or other communication equipment (such as other ANs) in the vicinity of the AN. The disclosure considers a scenario where the link between a AN and the WD depends on high gain directivity from the AN (transmit beam-forming) and possibly the WD (receive beam-forming) to limit interference in the network and to provide high SNR links. In such systems, spatial directivity may be used to overcome tight link budget at millimeter Wave (mmW) frequencies. Moreover, multiple feasible beams are identified for every link to overcome occasional obstacles.

Figure 1:
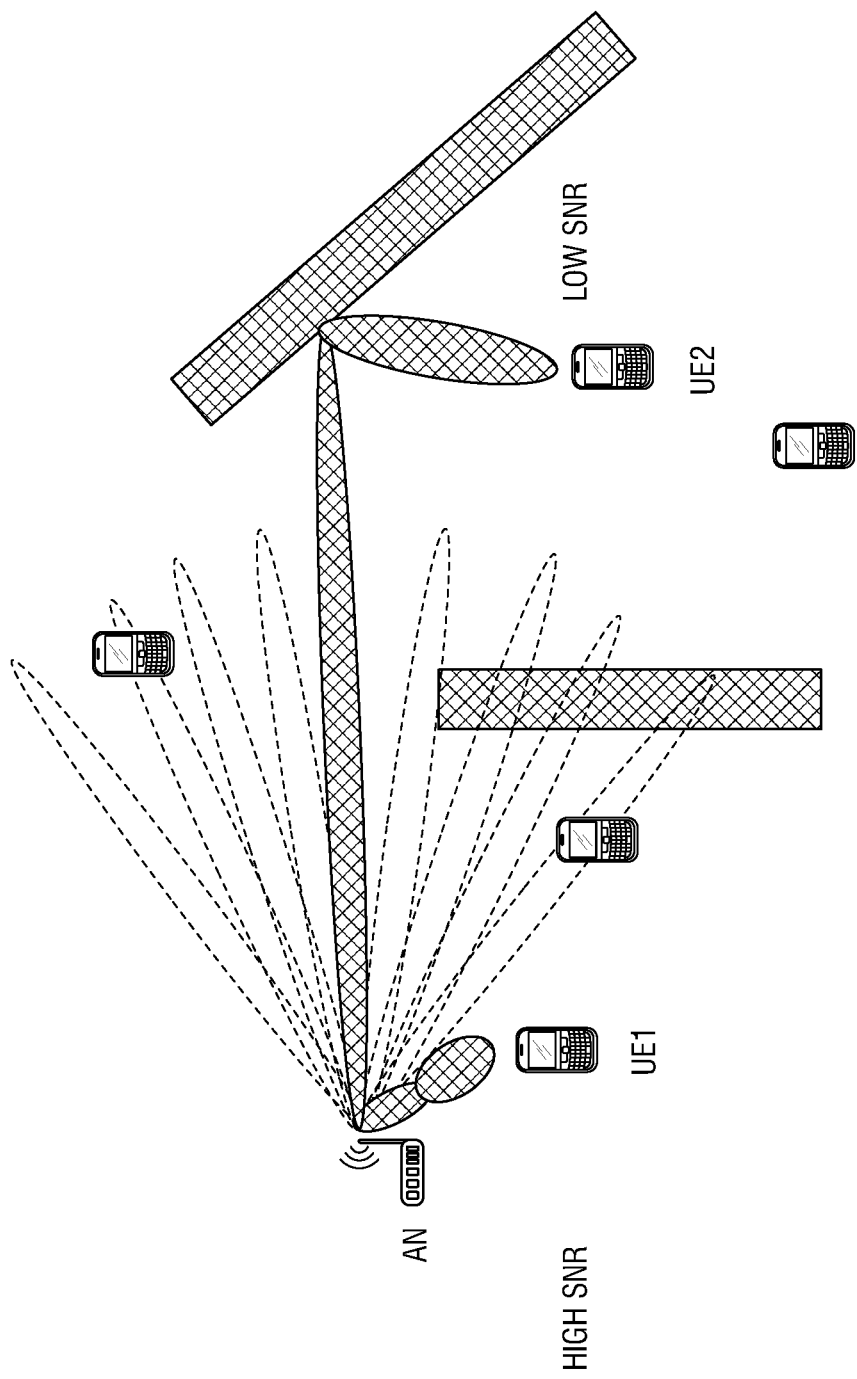
FIG. 1 is a schematic illustration of beam finding resulting in varying signal-to-noise ratios experienced by different wireless device.
Figure 2:
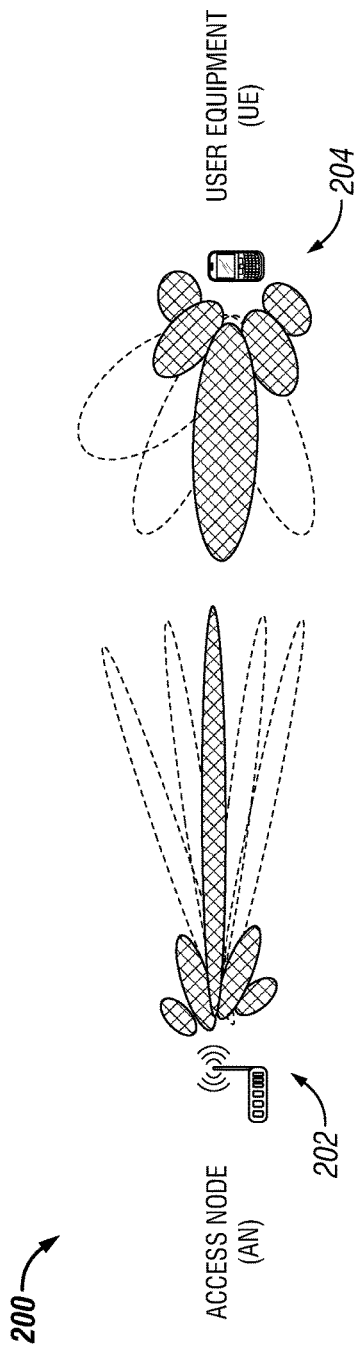
FIG. 2 is a schematic illustration of transmit and receive beam-forming in a mmW RAT network in accordance with embodiments of the present disclosure.

FIG. 2 is a schematic illustration of transmit and receive beam-forming in a mmW RAT network 200 in accordance with embodiments of the present disclosure. The AN 202 in this network 200 is capable of forming high gain beams in various directions. A typical synchronization procedure would involve the AN 202 sending known pilot signals (or pilots) or signature sequences successively in one or more directions in each transmission segment. Pilots may include a set of predefined signals on predefined radio resources. For example, the pilots may be transmitted on predetermined frequencies at regular time intervals. The other node, which may, for example be a wireless device (WD) 204, may detect and use these signals as a reference to which it can aligns its own frequency reference and timing. The WD could, in some instances, train its receiver beam to identify the best directions from which to receive the AN signal. The AN 202 or WD 204 may implement beam-forming using analog techniques such as phase shifters to shift the direction of the beams or using other techniques.

The performance of a communication link between the AN 202 and WD 204 depends on the amount of energy that can be transferred from the transmitter to the receiver. There are essentially two ways to close the link—transmitting a low power signal for a long period of time to allow energy accumulation over the long period, or the use of beam forming in a short period of time, but with the advantage of high antenna gain over that short period, again allowing adequate transfer of energy, which is the product of power received and the time period of reception.

This disclosure pertains to a design for the transmission of synchronization sequences. The synchronization signals are broadcast by the AN 204. In embodiments, the AN 204 can broadcast the synchronization sequences using more than one format, where at least one format is transmitted over a longer period of time than the other single format or plural formats. The longer synchronization blocks target users that have low SNR or are disadvantaged in other ways such as restrictions like analog beam-formers.

The ANs of the mmW RAT network shown in FIG. 2 broadcast synchronization signals periodically. The synchronization signals may further be of more than one type such as a Primary Synchronization Sequence (PSS) and a Secondary Synchronization Sequence (SSS), following a structure that is similar to LTE, and structured in a way to reduce search complexity for beam-forming.

Figure 3:
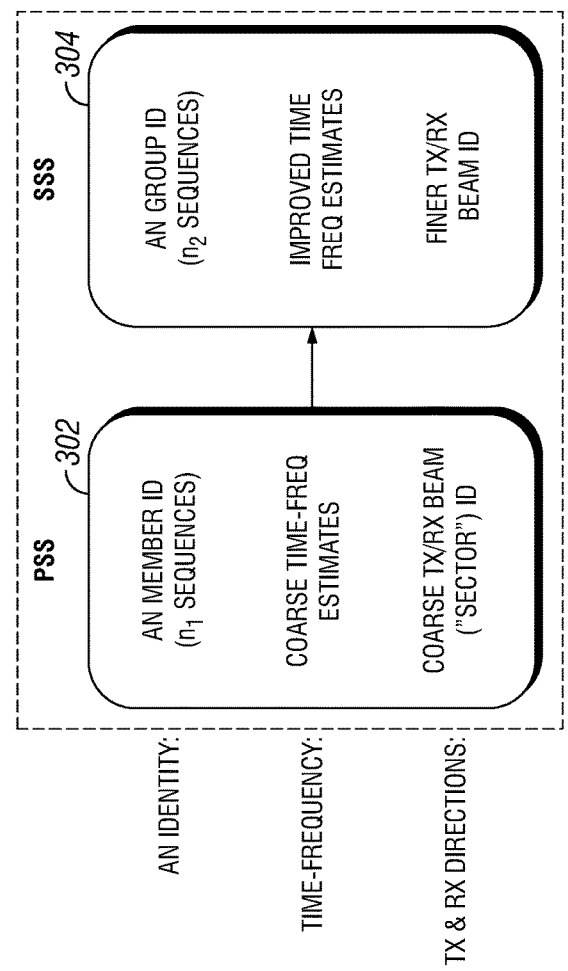
FIG. 3 is a schematic illustration comparing the primary synchronization signal and the secondary synchronization signal.

FIG. 3 is a schematic illustration 300 comparing the primary synchronization signal (PSS) 302 and the secondary synchronization signal (SSS) 304. As shown in FIG. 3, the PSS 302 is structured differently from the SSS 304. There are n unique AN-IDs that are divided into $n_2$ groups of $n_1$ members each. The PSS 302 includes AN member ID (n1 sequences), whereas the SSS 304 includes the AN group ID (n2 sequences). The PSS 302 includes coarse time-frequency estimates and coarse Tx/Rx beam ("sector") identifiers; whereas the SSS 304 include finer time-frequency estimates and finer Tx/Rx beam IDs.

The PSS is located in the last OFDM symbol of first time slot of the first subframe (subframe 0) of radio frame. The PSS structure and subframe location allows the WD to be synchronized on subframe level. Typically, the PSS is repeated in subframe 5, which means the WD can be synchronized on a 5 ms basis since each subframe is 1 ms. From PSS, the WD is also able to obtain physical layer identity (0 to 2).

The SSS symbols are also located in the same subframe of PSS but in the symbol before PSS. From SSS, the WD is able to obtain physical layer cell identity group number, as described above.

Figure 4:
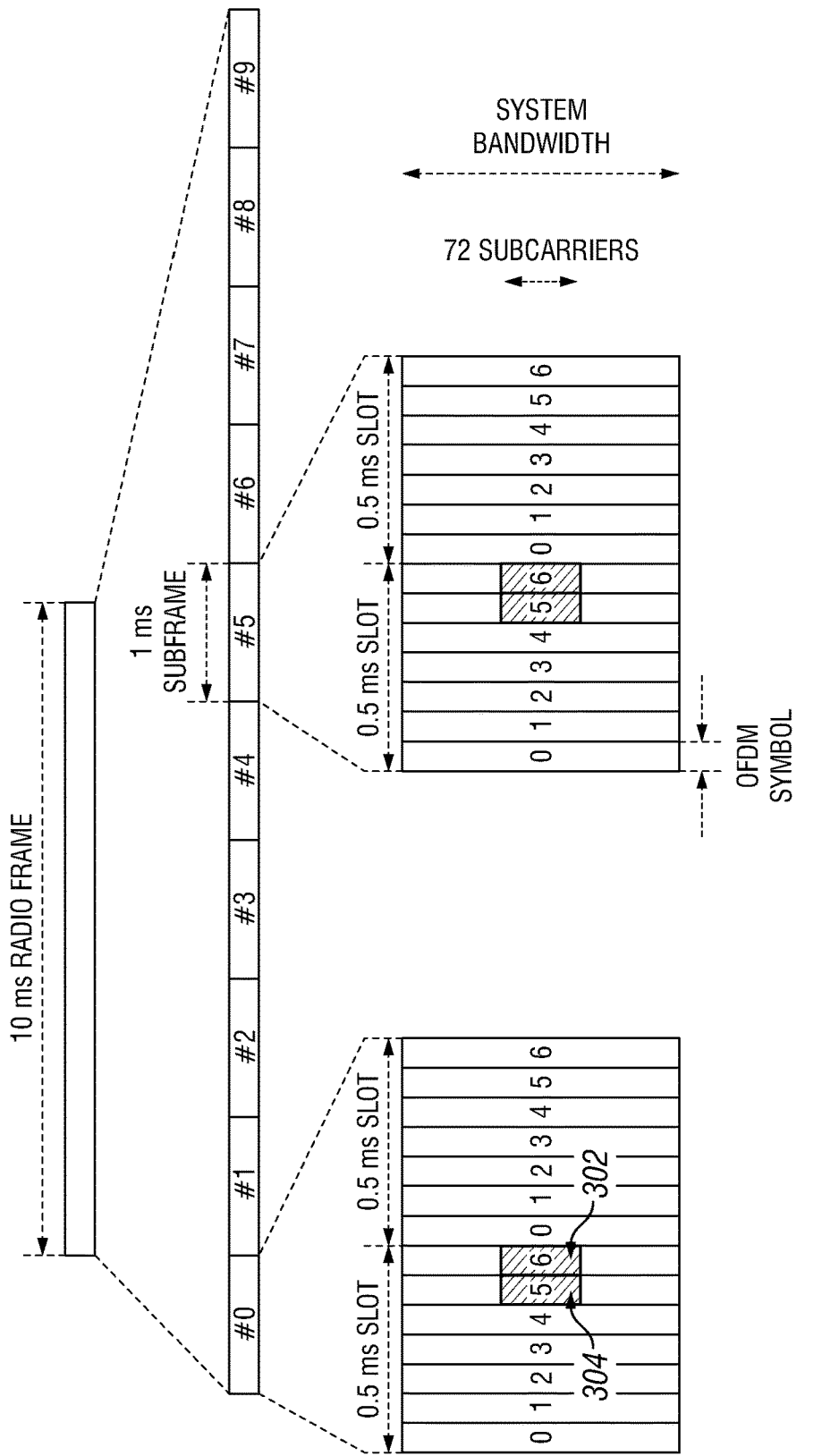
FIG. 4 is a schematic illustration of an OFDM radio frame showing the location of the primary synchronization signal and the secondary synchronization signal.

FIG. 4 is a schematic diagram of an OFDM radio frame showing the location of the PSS 302 and the SSS 304. The PSS 302 is transmitted in the center frequency portion of an OFDM symbol every 5 milliseconds. The PSS 302 is mapped into the first 31 subcarriers on either side of the DC subcarrier. Therefore, the PSS 302 uses six resource blocks with five reserved subcarriers on each side. In time division duplex (TDD) mode, the PSS is mapped to the third OFDM symbol in subframes 0 and 5. In frequency division duplex (FDD) mode, the PSS is mapped to the last OFDM symbol in slots 0 and 10.

As shown in FIG. 4, a secondary synchronization signal (SSS) 304 is also transmitted. The SSS 304 is based on maximum length sequences (m-sequences), which are pseudorandom binary sequences. Three m-sequences, each of length 31, are used to generate the synchronization signals. The SSS 304 is transmitted in the same subframe as the PSS but one OFDM symbol earlier. The SSS 304 is mapped to the same subcarriers (middle 72 subcarriers) as the PSS 302.

The PSS and SSS are defined in 3GPP TS 36.211. "Physical Channels and Modulation." 3rd Generation Partnership Project; Technical Specification Group Radio Access Network; Evolved Universal Terrestrial Radio Access (E-UTRA). The division of the synchronization signal into PSS and SSS in the 3GPP LTE specification signals is designed to reduce the complexity of the cell search process.

FIG. 5A is a schematic diagram of a frame structure showing extended synchronization signals in accordance with embodiments of the present invention. The regular, unextended PSS and SSS occur at specific time frequency coordinates periodically. In FIG. 5A, the PSS/SSS blocks 502 occur once per PSS period ($T_{PSS}$ 516), which is every 5 subframes in FIG. 5A (though the periodicity can be different depending on implementation choices). The PSS block 502 is shown in more detail in the inset and includes 1 PSS signal per sector (PSS and 4 sectors per PSS block. The PSS block 502 also includes basic system information (SI) 514.

FIG. 5B is a schematic diagram of an extended synchronization signal in accordance with embodiments of the present disclosure. The ePSS block 504 is shown to occur less often as the PSS block 502. In FIG. 5B, ePSS block 504 is shown to occur once for every 3 instances the PSS occurs. The ePSS block 504 can be set to occur during an Extended PSS Period ($T_{ePSS}$ 518). In FIG. 5A, the $T_{ePSS}$ 518 is shown to be equivalent to 20 subframes, but the $T_{ePSS}$ 518 is an adjustable period. That is, the $T_{ePSS}$ 518 can be different from what is shown in FIG. 5A. The $T_{PSS}$ 516 and $T_{ePSS}$ 518 highlight the difference in periodicity between the PSS 502 and ePSS 504: the PSS 502 occurs more often than the ePSS 504.

Each ePSS block 504 extends over a longer period of time than the PSS blocks 502, as shown in the insets in FIG. 5A (see FIG. 5B and FIG. 5C). Specifically, FIG. 5A shows that ePSS block 504 lasts for the duration of a whole subframe, while the PSS block 502 occurs over a portion of a subframe.

FIG. 5C is a schematic diagram of a synchronization signal in accordance with embodiments of the present disclosure. The PSS in each sector is labeled as 506, 508, 510, and 512, respectively. As can be seen in the insets on FIG. 5A, the ePSS block 504 repeats PSS four times per sector (with four sectors) for low SNR WDs or WDs that are otherwise disadvantaged. As shown from the inset (FIG. 5B) of ePSS block 504, each PSS signal 506, 508, 510, and 512 is repeated four times, once per sector. The PSS block 502 of FIG. 5C transmits one PSS per sector (PSS 506, 508, 510, and 512 are each shown once in the inset for block 502).

The ePSS block 504 also includes basic system information 514, which is shown in FIG. 5A and FIG. 5B to be transmitted over the entire subframe. The PSS block 402 shows SI 514 transmitted only for the duration of the subframe during which PSS is transmitted. Basic System information (SI) 514 occurs as part of each ePSS block 504. The basic SI may contain:

Network-specific info (e.g. Network ID)
Phase of hopping sequence
OFDM symbol #
# of RX beam scan per TX beam in SSS The PSS block 502 can be optionally frequency hopped to enable frequency diversity (shown in FIG. 5A by the PSS frequency spacing for each occurrence of the PSS 502 and ePSS 504).

Figure 6:
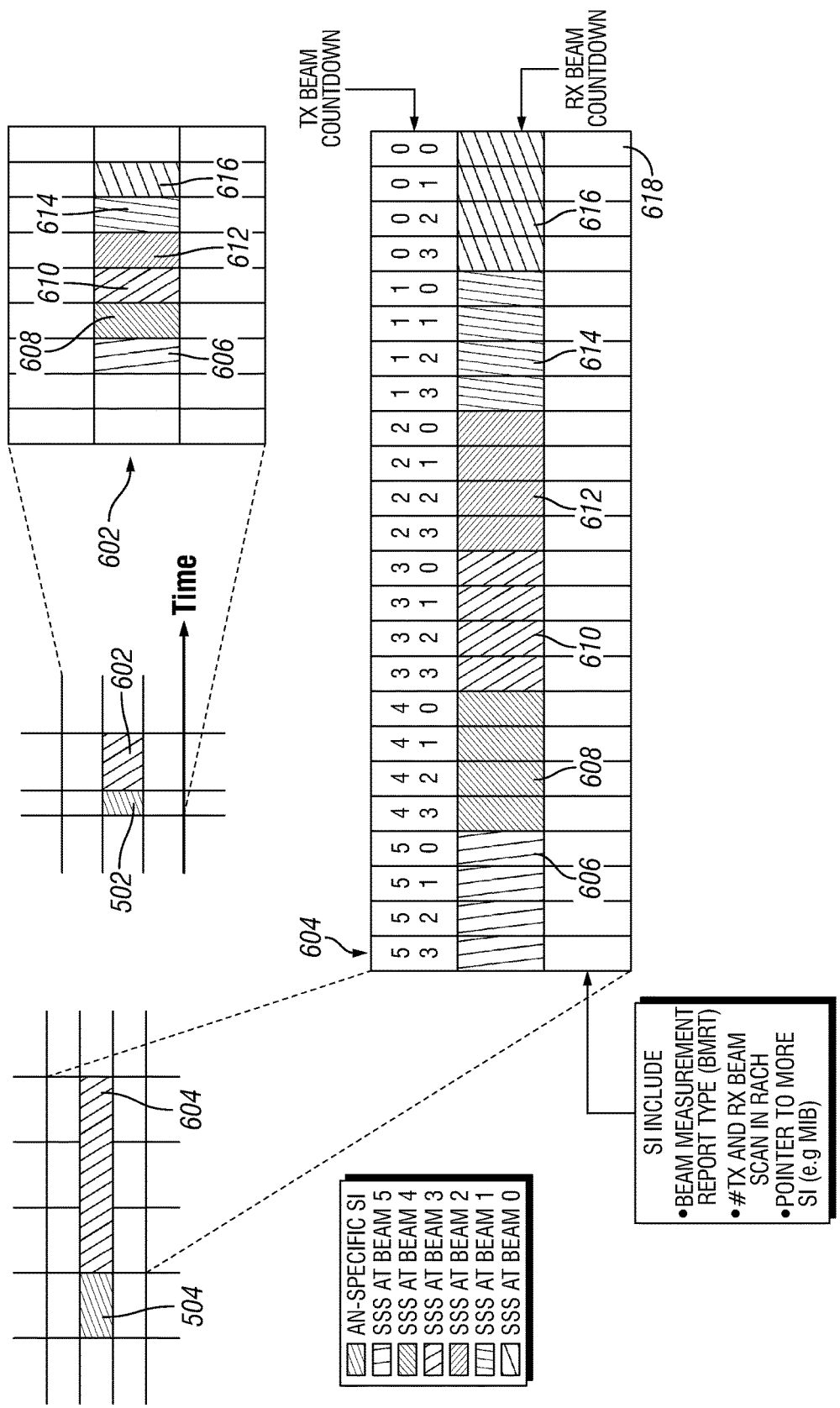
FIG. 6 is a schematic diagram of a frame structure showing extended primary and secondary synchronization signals in accordance with embodiments of the present disclosure.

Extended secondary synchronization signals (eSSS) may also be transmitted. FIG. 6 is a schematic diagram of an eSSS block 604 in accordance with embodiments of the present disclosure. As shown in FIG. 6, the SSS block 602 shares a subframe with PSS block 502. The ePSS block 504, however, occurs in a separate subframe than the eSSS block 604, which occurs across multiple subframes in the example shown in FIG. 6.

The ePSS block 504 scans over a larger number of beams. Each of beams 606, 608, 610, 612, 614, and 616 are repeated during the eSSS transmission so that a number of receive beams can be tested by WDs in range. System information 618 is also transmitted during the eSSS block 604. System information 618 for the eSSS block 604 includes one or more of the following: beam measurement report type (BRMT), the number of Tx and Rx beam scan in RACH, and the pointer to more system information (e.g., master information block (MIB)).

The PSS are AN-specific and provides a set of sequences for the activated sectors for the current synchronization period. The SSS are located at a fixed relative location in time to the PSS and may for example be composed of M-sequences. Similar properties would apply to the ePSS and eSSS, respectively.

Figure 7:
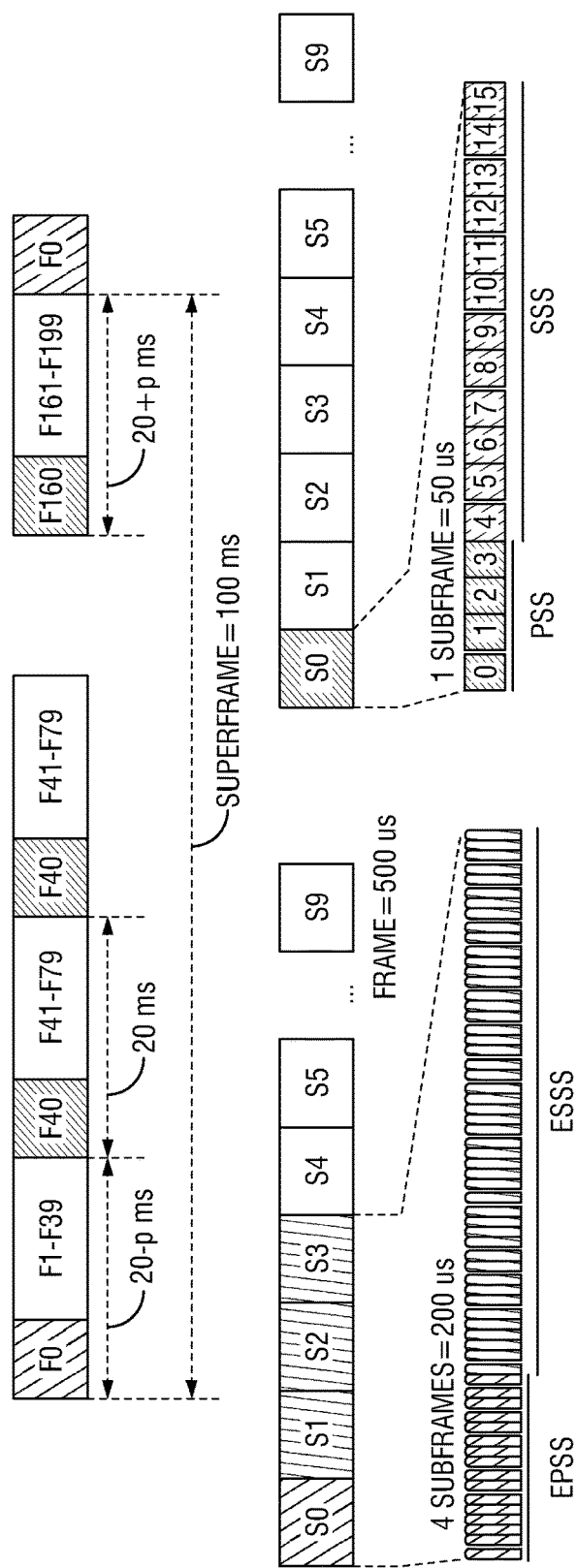
FIG. 7 is an example frame structure showing the extended synchronization signals and unextended synchronization signals in accordance to embodiments of the present disclosure.

FIG. 7 is an example frame structure showing the extended synchronization signals and unextended synchronization signals in accordance to embodiments of the present disclosure. FIG. 7 illustrates a frame structure that activates 16 beams during the ePSS, with the eSSS handling 3 beams for each of the ePSS beams for receive beam training (for a total of 48 beams). The regular, unextended PSS/SSS activates a smaller number of beams (in this example, 4 beams for PSS and 3 SSS beams for each of the PSS beams, for a total of 12 SSS beams).

The number of receive beam scan for each transmit beam in eSSS and regular SSS may be different to serve receivers with different capabilities. Further transmit and receive beam tuning can be performed in a succeeding dedicated training mode between the WD and the AN. This invention is not concerned with that function. The PSS is AN specific and is a limited number of sequences, say 8, that are reused by ANs in the network. Each PSS has a number of associated SSS, say 256, and the PSS and SSS combination determine timing and beam configuration. PSS/SSS sequences are optionally staggered between adjacent access points by p=0, 1, or 2 subframes to avoid collisions.

There are several ways by which beams can be activated within the ePSS/eSSS and the regular, unextended PSS/SSS groups. Without loss of generality, it is assumed that all of the ePSS can be enumerated (although further grouping of beams activated by the ePSS can be done). The regular, unextended PSS/SSS groups will in turn activate a smaller subset of the total number of beams with the subsets activated corresponding to one or more of the following categories:

a. Beams with a history of past WD detections
    b. Beams likely to provide high SNR In each scenario, the regular, unextended PSS/SSS can still be used for beams more likely to find WDs. For example, the likelihood may be determined based on historical data of past WD detections and/or WDs with high SNR (e.g., SNR above a threshold value, which can be predetermined by the network or can be set based on channel conditions).

Each regular, unextended PSS/SSS group might follow a different strategy to providing synchronization services. In an embodiment, each regular, unextended PSS/SSS group may focus on a subset of likely beams in the governing ePSS/eSSS group. Alternatively, the regular, unextended PSS/SSS might tradeoff directivity for wider coverage per beam—this strategy would be more likely to pick up WDs that have relatively better link SNR to the AN.

Figure 8:
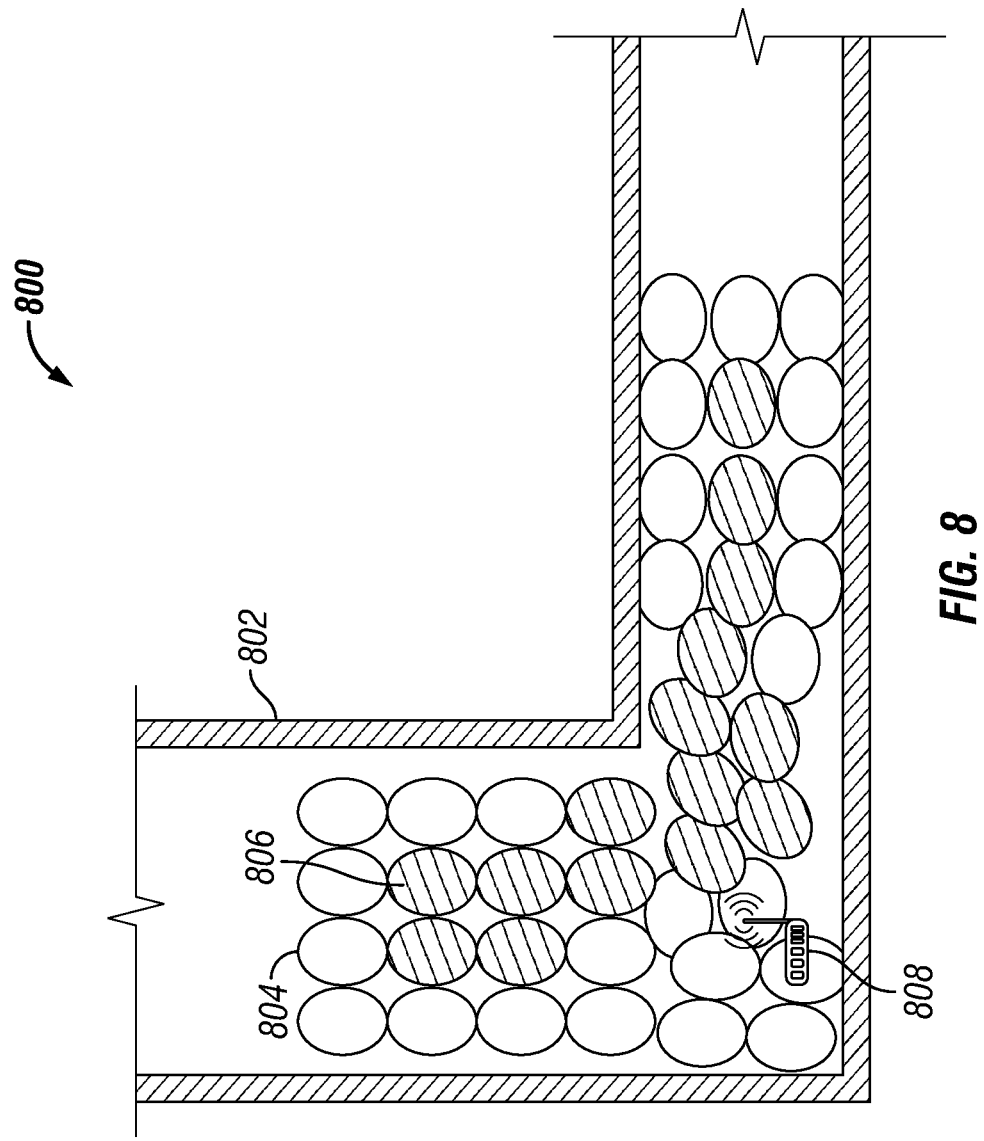
FIG. 8 is a schematic diagram of beams enumerated by the extended synchronization signal and beams enumerated by unextended synchronization signals.

FIG. 8 is a schematic diagram of beams enumerated by the extended synchronization signal and beams enumerated by unextended synchronization signals. In FIG. 8, a subset of beams more correlated with movement patterns that have been accumulated by an AN. The ePSS/eSSS could enumerate a larger number of beams (e.g., to reach disadvantaged WDs, as described above), while the regular, unextended PSS/SSS targets more likely beams. FIG. 8 illustrates how each type of synchronization signal could be used. FIG. 8 is a schematic 800 of a top down view of a covered corridor 802. Within the corridor 802 could be an AN 808 that provides service for WDs in the corridor 802. The ovals represent areas of signal illumination by the AN 808. The shaded ovals (e.g., oval 806) depict areas of illumination by the AN 808 that, for example, have a history of following pedestrian patterns within coverage of the AN 808. The shaded ovals 806, therefor, could be areas targeted by regular, unextended PSS/SSS. The unshaded ovals 804 represent areas where WDs experience low SNR or other issues that result in a disadvantage (as discussed above). The shaded ovals 804, therefore, could be targeted by ePSS/eSSS by the AN 808 to make up for the disadvantage.

Figure 9:
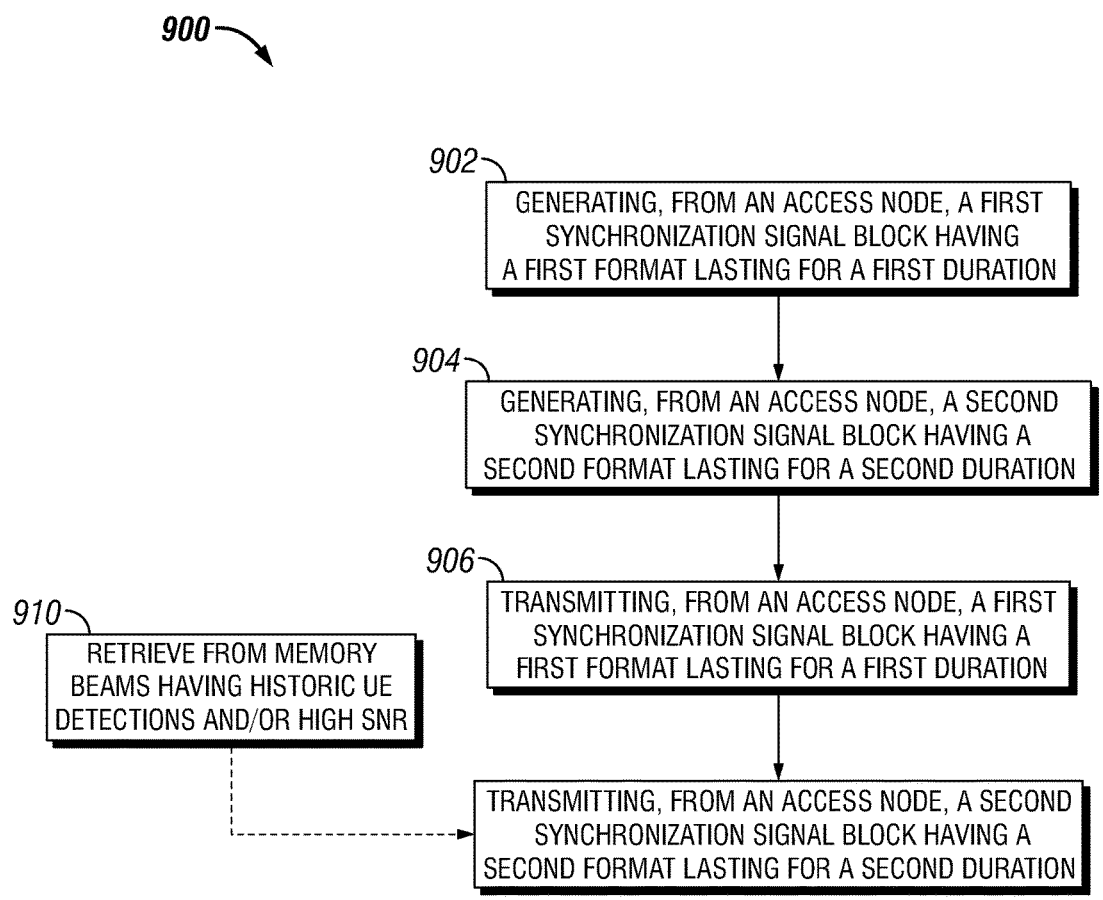
FIG. 9 is a process flow diagram for an access node for transmitting extended synchronization signals in accordance with embodiments of the present disclosure.

FIG. 9 is a process flow diagram 900 for an access node for transmitting extended synchronization signals in accordance with embodiments of the present disclosure. The AN can generate a first synchronization signal block 504 of a first format, lasting for a first duration (902). The AN can generate a second synchronization signal block 502 of a second format, lasting for a second duration (904). The AN can transmit a first synchronization signal block 504 of a first format, lasting for a first duration (906). In some embodiments, the first synchronization signal block 504 includes the ePSS and, in some embodiments, can also include the eSSS. The AN can also transmit a second synchronization signal block 502 of a second format lasting a second duration of time (908). In some embodiments, the second synchronization signal block includes the regular, unextended PSS, and in some embodiments, can also include the regular, unextended SSS. The first synchronization signal block 504 includes a first format different from the format of the second synchronization signal block. The first format may specify the number of beams for the ePSS and may also specify the number of corresponding beams for the eSSS (in some instances, the number of beams activated is the same between the first and second synchronization signal blocks; rather, the duration of active beams is what is different, discussed in FIG. 6 and below). Additionally or alternatively, the first format may also specify the number and/or content of SI blocks 514 transmitted with the first synchronization block. Additionally or alternatively, the first synchronization signal block format may include more synchronization signals per sector than the secondary synchronization signal block. The first synchronization signal block format may include more PSS per sector than the secondary synchronization signal block (see, e.g., FIG. 5A and FIG. 5B) and/or more SSS per sector than the secondary synchronization signal block (see, e.g., FIG. 6).

The first duration corresponds to the amount of time needed to transmit PSS 506-512 the determined number of times (in the case shown in FIG. 5B, four times each). The first synchronization signal block 504 is transmitted once per transmission period 518. Put differently, a transmission period is defined for the first synchronization signal block 504, which is adjustable by the AN or by an operator of the network. The first synchronization signal block is transmitted once during this transmission period 518, whereas the second synchronization signal block 502 is shown to be transmitted at least three times during the transmission period 518. More generally, the first synchronization signal block 504 is transmitted a fewer number of times that the second synchronization signal block 502.

In some embodiments, the AN retrieves historical data about previous connections with WDs (910). The regular, unextended PSS/SSS groups will in turn activate a smaller subset of the total number of beams with the subsets activated corresponding to one or more of the following categories:
  a. Beams with a history of past WD detections
  b. Beams likely to provide high SNR In each scenario, the regular, unextended PSS/SSS can still be used for beams more likely to find WDs. For example, the likelihood may be determined based on historical data of past WD detections and/or WDs with high SNR (e.g., SNR above a threshold value, which can be predetermined by the network or can be set based on channel conditions).

Figure 10:
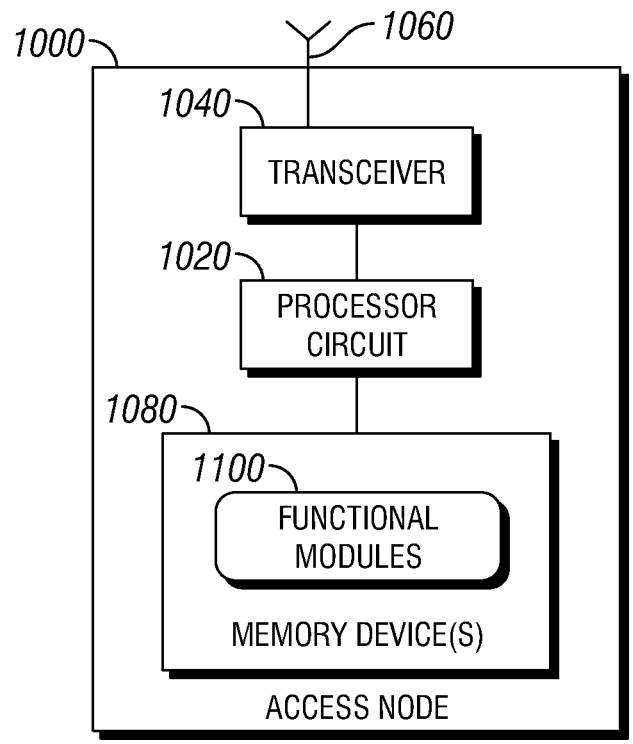
FIG. 10 is a schematic block diagram of an access node in accordance with embodiments of the present disclosure.

FIG. 10 is a schematic diagram of an example access node 1000 according to embodiments of the present disclosure. As shown in FIG. 10, the access node 1000 includes a processor circuit 1020, a memory 1080, a transceiver 1040, and an antenna 1060. The memory 1080 can store instructions that can be executed by the processor 1020. The memory 1080 can also store functional modules 1100, which are described in more detail in FIG. 11. The memory 1080 can also store information pertaining to historical data of connected WDs, the locations of WDs when they were connected to the AN, indications of SINR/SNR or other channel conditions for specific beams, etc.

In particular embodiments, some or all of the functionality described above as being provided by a base station, a node B, an enhanced node B, and/or any other type of network node may be provided by the node processor executing instructions stored on a computer-readable medium, such as the memory shown in FIG. 10. Alternative embodiments of the radio access node may include additional components responsible for providing additional functionality, including any of the functionality identified above and/or any functionality necessary to support the embodiments described herein.

In embodiments, the access node may be a base station, a node B, an enhanced node B, and/or any other type of network node may be provided by the node processor executing instructions stored on a computer-readable medium, such as the memory shown in FIG. 10. Alternative embodiments of the radio access node may include additional components responsible for providing additional functionality, including any of the functionality identified above and/or any functionality necessary to support the solution described above.

Figure 11:
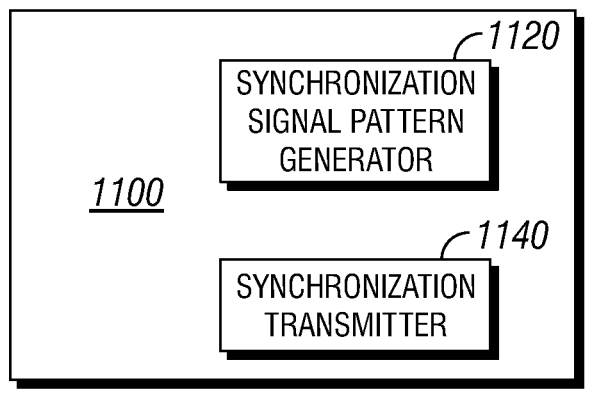
FIG. 11 is a schematic block diagram of modules for an access node in accordance with embodiments of the present disclosure.

FIG. 11 is a schematic block diagram of functional modules 1100 of an access node in accordance with embodiments of the present disclosure. The functional modules 1100 can include a module for generating synchronization signal blocks 1120, such as first synchronization signal block 504 and second synchronization signal block 502. The functional modules 1100 can also include a module for transmitting synchronization signal blocks 1140, such as first synchronization signal block 504 and second synchronization signal block 502.

Figure 12:
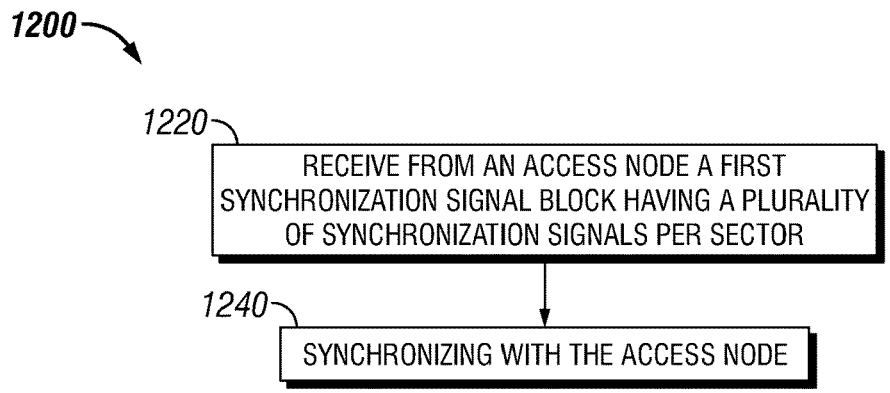
FIG. 12 is a process flow diagram for a wireless device in accordance with embodiments of the present disclosure.

FIG. 12 is a process flow diagram 1200 for a wireless device in accordance with embodiments of the present disclosure. The WD receives, from an access node, a first synchronization signal block having a plurality of synchronization signals per sector (1220). The WD synchronizes with the access node (1240). In embodiments, the WD trains the receiver beam to detect synchronization signals from a certain direction. The WD can use positioning information as well as historical information about the location and previous connections (from the WD itself or from other WDs) to identify how and where to train the receiver beam. In embodiments, the WD is a disadvantaged WD, and the synchronization signal is an enhanced primary synchronization signal and/or enhanced secondary synchronization signal.

Figure 13:
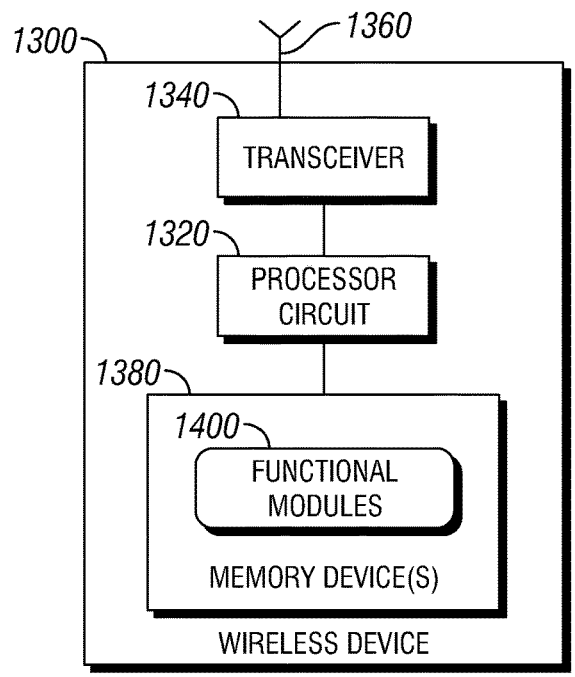
FIG. 13 is a schematic block diagram of a wireless device in accordance with embodiments of the present disclosure.

FIG. 13 is a schematic block diagram of a wireless device 1300 in accordance with embodiments of the present disclosure. As shown in FIG. 13, the example wireless device includes a processor circuit 1320, a memory 1380, a transceiver 1340, and an antenna 1360. In particular embodiments, some or all of the functionality described above as being provided by WDs, MTC or M2M devices, and/or any other types of wireless communication devices may be provided by the device processor executing instructions stored on a computer-readable medium, such as the memory shown in FIG. 13. Alternative embodiments of the wireless communication device may include additional components beyond those shown in FIG. 13 that may be responsible for providing certain aspects of the device's functionality, including any of the functionality described above and/or any functionality necessary to support the solution described herein.

The WD 1300 is configured to receive synchronization signals and synchronize with an access node, such as access node 1000. The WD may be a disadvantaged WD. That is, the WD may experience low signal to noise ratio may have other characteristics or may be in a location that makes it difficult to connect to an access node. The WD may train its transceiver 1340 to connect search for receive-beams from certain directions. The transceiver 1340 may also be configured to search for synchronization signals over a larger time interval (specifically, for a period $T_{ePSS}$, which is a predetermined time period defined by the network or is dynamically established by the access node or WD when the WD is disadvantaged).

In embodiments, the WD may be a user equipment (UE), such as a mobile handset, tablet PC, cellular phone, smart phone, or other device. The WD may also include machine-type communication devices (so-called MTC devices), M2M devices, and/or any other types of wireless communication devices may be provided by the device processor executing instructions stored on a computer-readable medium, such as the memory shown in FIG. 13. Alternative embodiments of the wireless communication device may include additional components beyond those shown in FIG. 13 that may be responsible for providing certain aspects of the device's functionality, including any of the functionality described above and/or any functionality necessary to support the solution described above.

Figure 14:
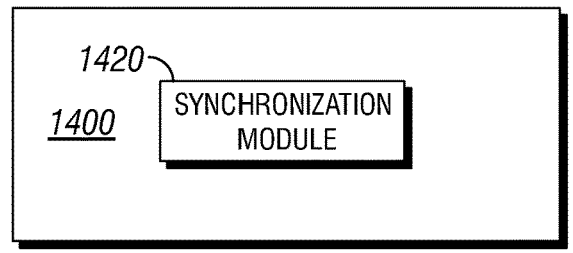
FIG. 14 is a schematic block diagram of modules for a wireless device in accordance with embodiments of the present disclosure.

The WD memory 1380 is configured to store instructions executed by the processor circuit 1220. The memory 1380 can also store functional modules 1400. FIG. 14 is a schematic block diagram of functional modules in accordance with embodiments of the present disclosure. Functional modules 1400 include a synchronization module 1420 configured to synchronize the WD with the access node. The synchronization module can configure the WD to adapt the WD transceiver to search for synchronization signals over a larger period of time, as described above.

What is claimed is:

1. A method performed at an access node, AN, the AN configured to communicate wirelessly with a wireless device (WD), the method comprising:
    transmitting from the AN a first synchronization signal block of a first format comprising an extended primary synchronization signal and an extended secondary synchronization signal for a first duration of time; and
    transmitting from the AN a second synchronization signal block of a second format comprising a primary synchronization signal and a secondary synchronization signal for a second duration of time, the first duration of time comprising a longer duration than the second duration,
    wherein the AN is identified using an AN-ID that is one of a plurality of unique AN-IDs, the plurality of unique AN-IDs being divided into a plurality of groups, each group comprising a plurality of members, such that each of the plurality of unique AN-IDs corresponds to a specific group and a member of the specific group,
    wherein each of the extended secondary synchronization signal and the secondary synchronization signal indicates the same particular one of the groups, and
    wherein each of the extended primary synchronization signal and the primary synchronization signal indicates the same one of the members of the particular group indicated by the extended secondary synchronization signal and the secondary synchronization signal, thereby communicating to the wireless device, together with the particular group indicated by the extended secondary synchronization signal and the secondary synchronization signal, the AN-ID of the AN.

2. The method of claim 1, wherein the first synchronization signal block activates the same beam two or more times.

3. The method of claim 1, wherein system-information is transmitted adjacent in time or in frequency to one or both of the first synchronization signal block and the second synchronization block.

4. The method of claim 3, wherein the system-information transmitted adjacent to the first synchronization signal block contains information about the set of beams activated in the second synchronization signal block.

5. The method of claim 4, wherein the information about the set of beams activated in the second synchronization signal block includes the number of times at least one of the activated beam are repeatedly activated within the second synchronization signal block.

6. The method of claim 3, wherein the system-information contains the OFDM symbol number within a subframe.

7. The method of claim 1, wherein the first synchronization signal block activates more beams per sector than the second synchronization signal block.

8. The method of claim 7, wherein the second synchronization signal block activates beams with a history of past WD detections.

9. The method of claim 7, wherein the second synchronization signal block activates beams with a historic signal-to-noise ratio above a threshold value.

10. The method of claim 7, wherein the second synchronization signal block activates a subset of the beams activated by the first synchronization signal block.

11. The method of claim 7, wherein the first synchronization signal block comprises a primary synchronization signal and a secondary synchronization signal, the secondary synchronization signal activates beams having wider coverage than the beams activated by the primary synchronization signal.

12. The method of claim 1, wherein the extended secondary synchronization signal of the first synchronization signal block is transmitted for a longer duration than the secondary synchronization signal of the second synchronization signal block.

13. An access node, AN, configured to communicate wirelessly with a wireless device (WD) and comprising:
    a hardware processor;
    a memory; and
    a transceiver;
    the AN configured to:
    transmit from the AN a first synchronization signal block of a first format comprising an extended primary synchronization signal and an extended secondary synchronization signal for a first duration of time; and
    transmit from the AN a second synchronization signal block of a second format comprising a primary synchronization signal and a secondary synchronization signal for a second duration of time, the first duration comprising a longer duration than the second duration,
    wherein the AN is identified using an AN-ID that is one of a plurality of unique AN-IDs, the plurality of unique AN-IDs being divided into a plurality of groups, each group comprising a plurality of members, such that each of the plurality of unique AN-IDs corresponds to a specific group and a member of the specific group,
    wherein each of the extended secondary synchronization signal and the secondary synchronization signal indicates the same particular one of the groups, and
    wherein each of the extended primary synchronization signal and the primary synchronization signal indicates the same one of the members of the particular group indicated by the extended secondary synchronization signal and the secondary synchronization signal, thereby communicating to the wireless device, together with the particular group indicated by the extended secondary synchronization signal and the secondary synchronization signal, the AN-ID of the AN.

14. The access node of claim 13, wherein the first synchronization signal block is transmitted with less periodicity than the second synchronization signal block.

15. The access node of claim 14, wherein the first synchronization signal block is transmitted once per transmission period and the second synchronization signal block is transmitted at least twice per transmission period.

16. The access node of claim 13, wherein the extended secondary synchronization signal is located in a fixed relative location from the extended primary synchronization signal.

17. The access node of claim 16, wherein the extended secondary synchronization signal is located in a subframe that is transmitted after a subframe in which the extended primary synchronization signal is transmitted.

18. The access node of claim 16, wherein the extended secondary synchronization signal comprises AN-specific pilot sequences.

19. The access node of claim 16, wherein the extended secondary synchronization signal comprises a maximum length sequence (MLS).

20. The access node of claim 13, wherein the first synchronization signal block is phase offset from the second synchronization signal block.

21. A method performed at a wireless device (WD), the WD configured to communicate wirelessly with an access node (AN), the method comprising:
receiving from the AN a first synchronization signal block of a first format comprising an extended primary synchronization signal and an extended secondary synchronization signal for a first duration; and
receiving from the AN a second synchronization signal block of a second format comprising a primary synchronization signal and a secondary synchronization signal for a second duration, the first duration being longer than the second duration,
wherein the AN is identified using an AN-ID that is one of a plurality of unique AN-IDs, the plurality of unique AN-IDs being divided into a plurality of groups, each group comprising a plurality of members, such that each of the plurality of unique AN-IDs corresponds to a specific group and a member of the specific group,
wherein each of the extended secondary synchronization signal and the secondary synchronization signal indicates the same particular one of the groups, and
wherein each of the extended primary synchronization signal and the primary synchronization signal indicates the same one of the members of the particular group indicated by the extended secondary synchronization signal and the secondary synchronization signal, thereby communicating to the wireless device, together with the particular group indicated by the extended secondary synchronization signal and the secondary synchronization signal, the AN-ID of the AN.

22. The method of claim 21, wherein one or both of the first synchronization signal block and the second synchronization signal block repeatedly activate the same beam two or more times.

23. The method of claim 21, wherein a system-information block is adjacent in time or in frequency to one or both of the first synchronization signal block or the second synchronization block.

24. The method of claim 23, wherein the system-information block adjacent to the first synchronization signal block contains information about the set of beams activated in the second synchronization signal block.

25. The method of claim 24, wherein the information about the set of beams activated in the second synchronization signal block includes the number of times at least one of the activated beam are repeatedly activated within the second synchronization signal block.

26. A wireless device (WD) of a millimeter wave radio access technology (mmW RAT) system, the WD configured to communicate wirelessly with an access node (AN) and comprising:
a hardware processor;
a memory; and
a transceiver;
the WD configured to:
receive from the AN a first synchronization signal block of a first format comprising an extended primary synchronization signal and an extended secondary synchronization signal for a first duration of time; and
receive from the AN a second synchronization signal block of a second format comprising a primary synchronization signal and a secondary synchronization signal for a second duration of time, the first duration being longer than the second duration,
wherein the AN is identified using an AN-ID that is one of a plurality of unique AN-IDs, the plurality of unique AN-IDs being divided into a plurality of groups, each group comprising a plurality of members, such that each of the plurality of unique AN-IDs corresponds to a specific group and a member of the specific group,
wherein each of the extended secondary synchronization signal and the secondary synchronization signal indicates the same particular one of the groups, and
wherein each of the extended primary synchronization signal and the primary synchronization signal indicates the same one of the members of the particular group indicated by the extended secondary synchronization signal and the secondary synchronization signal, thereby communicating to the wireless device, together with the particular group indicated by the extended secondary synchronization signal and the secondary synchronization signal, the AN-ID of the AN.

27. The WD of claim 26, wherein the second synchronization block activates beams with a historic signal-to-noise ratio above a threshold value.

28. The WD of claim 26, wherein the second synchronization signal activates a subset of the beams activated by the first synchronization signal.

29. The WD of claim 26, wherein the first synchronization signal block comprises a primary synchronization signal and a secondary synchronization signal, the secondary synchronization signal activates beams having wider coverage than the beams activated by the primary synchronization signal.

* * * * *